Figure 1:

United States Patent [19]

Keeney

[11] Patent Number: 4,472,280
[45] Date of Patent: Sep. 18, 1984

[54] SODIUM CARBONATE (SODA ASH) CRYSTAL MODIFICATION

[75] Inventor: Mark E. Keeney, Lisle, Ill.

[73] Assignee: Nalco Chemical Company, Oak Brook, Ill.

[21] Appl. No.: 539,494

[22] Filed: Oct. 6, 1983

[51] Int. Cl.³ ............................................ B01D 15/00
[52] U.S. Cl. .................................. 210/666; 210/669; 210/691; 210/694; 423/206 T
[58] Field of Search ............... 210/666, 691, 694, 669, 210/683, 727, 728, 735, 736, 909; 423/206 T

[56] References Cited

U.S. PATENT DOCUMENTS

| | | | |
|---|---|---|---|
| 3,259,471 | 7/1966 | Cortessis et al. | 423/206 T |
| 3,300,406 | 1/1967 | Pollio | 210/666 |
| 3,528,766 | 9/1970 | Coglaiti et al. | 423/206 T |
| 4,075,281 | 2/1978 | Port et al. | 423/206 T |
| 4,374,102 | 2/1983 | Connelly et al. | 423/206 T |

*Primary Examiner*—Ivars Cintins
*Attorney, Agent, or Firm*—John G. Premo; Robert A. Miller; Donald G. Epple

[57] ABSTRACT

The invention comprises a method of removing anionic polymers and acidic organic impurities from aqueous trona solutions prior to crystallization whereby improved crystal formation is achieved which comprises treating such solutions with at least one nitrogen containing cationic compound consisting of water-soluble cationic polymers and fatty substituted quaternary ammonium salts followed by a solid adsorbant from the group consisting of clays and activated carbon.

6 Claims, 17 Drawing Figures

FIG. 6A  BEFORE
FIG. 6B  AFTER

SODIUM CARBONATE (SODA ASH) CRYSTAL MODIFICATION

INTRODUCTION

The production of soda ash from crude trona ore involves various steps requiring liquid/solids separation. The process is described in detail in U.S. Pat. No. 4,374,102, the disclosure of which is incorporated herein by reference. Digested mother liquor must be separated from the insoluble gangue minerals, suspended insolubles must be filtered from crytallizer feed, and the soda ash crystals must be isolated from the pregnant solution. As with many mineral processing operations, the use of synthetic reagents to assist in liquid/solids separation has proven to be a valuable asset to the soda ash industry. Unfortunately, indiscriminate use can have serious side effects which adversely affect crystal quality. For example, one soda ash plant successfully used a reagent program consisting of a copolymer of sodium acrylate/acrylamide in conjunction with a poly-DADMAC[1] coagulant for thickening and clarification at its facility until an accidental overdose of the flocculant caused severe crystallization problems.

[1] polydiallyl dimethyl ammonium chloride

Industrial crystallization processes are extremely complex operations. A variety of physiochemical factors significantly impact the morphological and strength properties of the crystals produced. One factor that has been identified as being detrimental to the strength of soda ash crystals is the concentration of soluble organic acids (humates, rosin type, etc.) in the crystallizer feed. Crystal strength is an important parameter for solids handling since weak (friable) crystals often cause dusting problems during transport and storage.

THE INVENTION

The invention comprises a method of removing anionic polymers and acidic organic impurities from aqueous trona solutions prior to crystallization whereby improved crystal formation is achieved which comprises treating such solutions with at least one nitrogen containing cationic compound chosen from the group consisting of water-soluble cationic polymers and fatty substituted quaternary ammonium salts followed by a solid adsorbant from the group consisting of clays and activated carbon.

In a preferred embodiment of the invention, the cationic polymer is a blend of cationic polymers comprising diallyl dimethyl ammonium chloride polymer (poly-DADMAC) and an ethylene dichloride ammonia polymer quaternized with methyl chloride.

The fatty substituted quaternary ammonium salt is, preferably, N-tallow pentamethyl propane diammonium chloride.

The adsorbant is, preferably, a clay and, most preferably, a bentonitic clay such as a high surface area sodium montmorillonite. A preferred species of this clay is the hectorite clay sold under the tradename, NALCO 650, by Nalco Chemical Co.

Dosage

The amount of nitrogen containing cationic compound or blend thereof useful in treating the trona solutions should be about 1.5–2 times the amount of anionic coagulant present in such solutions. This excess dosage also allows for removal of any organic acidic materials naturally occurring in these trona solutions which contribute to poor crystal formation.

Excesses as high as 3–4 times the amount of cationic nitrogen containing compound to anionic polymer present in the solution may also be used.

It is important to achieve optimum benefits when practicing the invention to first add the cationic nitrogen containing compound to the trona solution with mixing and to then add the clay or other adsorbant whiceh is preferably in the form of an aqueous slurry or suspension.

The amount of clay or other adsorbant added can range from 1–1000 ppm based on the total weight of the trona solution.

The Cationic Nitrogen Containing Compounds or Blends

The preferred cationic polymers are blends although individual polymers may also be used. A typical efficacious group of polymers are the quaternized allylamine polymers, particularly poly-DADMAC. These polymers and their method of preparation are described in Butler, U.S. Pat. No. 3,288,770 which is incorporated herein by reference. Another preferred group of polymers are the ethylene dichloride quaternary ammonium polymers which have been quaternized with, for example, methyl chloride. Polymers of this type are described in U.S. Pat. No. 3,372,129.

Another group of cationic polymers that can be used in the practice of the invention are described in U.S. Pat. No. 4,374,102 at columns 4-5-6-7-8. Included within this definition of polymers and described in column 8 are the so-called "fatty quaternary amine polyamine" materials such as fatty propylene diamines which have been reacted with quaternizing agents such as methyl chloride. The above patent and all of the above references specifically mentioned above are incorporated herein by reference.

EXAMPLES

Trona Brine Treatment

The trona brine utilized for this crystallization study was supplied by a commercial soda ash facility. Unless otherwise noted, all tests referred to thereafter were conducted on crystallizer feed.

Individual brine samples were treated with a specific reagent combination such that the final volume, after reagent addition, was 500 ml. Latex polymers[2] were added to the brine as 1% solutions in distilled water. Bentonite clay (sodium montmorillinite) was added either neat or as a 5% slurry in distilled water. Solution cationic reagents were added either neat or as dilute solutions in distilled water. Details of the brine treatment are as follows:

(a) Brine samples (~5 gallons) were warmed in a hot water bath to dissolve crystallized materials.
(b) Individual brine samples were taken and placed in a one liter Erlenmeyer flask containing a teflon-coated stir-bar. The sample was stirred rapidly and continuously during reagent treatment.
(c) Latex polymers were added and allowed to mix for 1 minute prior to further reagent addition.
(d) Cationic reagents were permitted to mix with the brine for 1 minute prior to adsorbant additions.
(e) Adsorbants were permitted to contact the brine for 4 minutes.

(f) Following reagent treatment, the brine samples were filtered through a Buchner funnel fitted with #42 filter paper prior to charging the evaporative crystallizer.

[2] These polymers and their method of manufacture and formation into solutions in water are described in Vanderhoff, U.S. Pat. No. 3,284,393 and Anderson, et al., U.S. Pat. No. Re. 28,474.

Evaporative Crystallizer Design

A simple crystallizer apparatus was utilized for the research reported herein. The crystallizer consists of a one-liter, 4 neck reaction flask fitted with a central glass stirrer, condensor with receiver flask, thermometer, and glass plug.

Crystallization Procedure

The procedure employed for all crystallization runs was as follows:

(a) A 500 ml sample of treated brine was introduced into the evaporative crystallizer and heated to reflux under constant stirring. Reflux was maintained at 83°–85° C. using a vacuum of ~17" Hg.

(b) A 50 g sample of commercial soda ash was added to the crystallizer as seed crystal immediately upon reaching reflux.

(c) Vacuum distillation was maintained until 200 ml of distillate was collected in the receiving flask.

(d) The $Na_2CO_3.H_2O$ crystals were isolated from the hot crystallizer slurry using a laboratory basket-type centrifuge. The crystals were permitted to air dry prior to size distribution and friability testing.

Size Distribution

Crystal size distributions were determined on 50 g samples of soda ash crystals using U.S. Standard sieve screens.

Friability Testing

Friability testing was performed using a standard technique which is described as follows:

(a) A 20 g sample of −20/+80 mesh soda ash was placed in a 100 mesh sieve containing 50 g of glass beads (2 mm). The sieve was covered and placed on a Rotap mill for 5 minutes.

(b) The amount of −100 mesh material collected in the catch pan is weighed and the total percentage is the friability index.

Results and Discussion

1. Inherent Organic Acid Effects

Figure 2:
Figure 3:

It has long been suspected that a major source of crystallization problems is the level of organic acids in the crystallizer feed due to decomposition of kerogeneous material in the trona ore. The organic species are believed to be primarily mono-carboxylic acids with smaller quantities of poly-acids. Attempts at chromatographic analyses to identify the acid species have been unsuccessful, apparently due to the complex nature of the brine. However, the effect of organic impuruties on crystal quality can be seen in FIGS. 1–3. FIG. 1 is an SEM micrograph of $Na_2CO_3.H_2O$ crystals produced in the laboratory using commercial crystallizer feed. The crystals are uniform in size with few structural defects. FIG. 2 is an identical magnification (100×) of commercial production crystals used as seed for the crystallization work. Note the similar size distribution and crystal quality as the laboratory produced crystals. FIG. 3 is a micrograph of $Na_2CO_3.H_2O$ crystals produced from recycled* laboratory crystallizer brine (one recycle). The irregularity in the crystal face is clearly evident and is reflected in the high friability index (14.4% vs. 6% in FIG. 1). It appears as if the friability problems are due to shearing of the crystal along these facial defects. However, while there appears to be little effect on the crystal size distribution of the $Na_2CO_3.H_2O$ crystals due to the elevated organic levels, a decrease in solids density is observed.

*Recycle consists of returning the centrate from the basket centrifuge to the crystallizer and adding additional fresh brine to make 500 ml total solution. This technique (locked cycle) simulates no outlet for the organic acid species.

Various polymers and adsorbants were tested to determine their effect on crystallization. These materials are set forth in the Glossary below.

| Composition No. | Composition |
|---|---|
| | Glossary |
| 1. | 28% Latex copolymer[3] of 67% sodium acrylate, 33% acrylamide, RSV = 32–38 |
| 2. | 10% solution (polydiallyldimethyl ammonium chloride [η] = 0.5–0.8) 22.5% solution ethylene dichloride ammonia polymer quaternized with methyl chloride |
| 3. | 8% solution (polydiallyldimethyl ammonium chloride [η] = 0.5–0.8) 25.8% solution ethylene dichloride ammonia polymer quaternized with methyl chloride |
| 4. | Bentonite Clay (sodium montmorillinite) |
| 5. | 26.5% latex acrylamide homopolymer, RSV > 20 |
| 6. | 30% latex copolymer of 37% sodium acrylate, 63% acrylamide, RSV = 31–36 |
| 7. | 30% latex sodium acrylate homopolymer, RSV = 22–26 |
| 8. | 20% solution poly-DADMAC, [η] = 0.5–0.8 |
| 9. | 26.4% latex acrylamide homopolymer, RSV = 20–24 |
| 10. | 27.4% latex acrylamide homopolymer, RSV = 6 |
| 11. | N—tallow pentamethyl propane diammonium chloride |
| 12. | EDC-NH3 quaternized condensate |
| 13. | 45% solution of epichlorohydrin dimethylamine ammonia quaternary ammonium salt polymer prepared in accordance with Panzer, U.S. Pat. No. 3,738,945. |
| 14. | Activated Carbon |
| 15. | Kaolin Clay |
| 16. | Pelletized Bentonite Clay (Volclay) |
| 17. | Calcium Bentonite Clay. |

[3] Latex polymers as described in U.S. Re. 28,474. They contain oil and water and are in the form of a water-in-oil emulsion.

2. Polymer Effects

The effects of various polymer and reagent schemes on crystal morphology are given in Table I. The components from the latex polymers (non-polymeric) have no significant affect on crystal quality. However, acrylate containing polymers have a severe deleterious effect on crystal morphology. The higher the level of acrylate functionality in the polymer, the more dramatic the impact on crystal structure.

FIG. 4 (A–G) shows a series of micrographs of $Na_2CO_3.H_2O$ crystals produced at various levels of Comp. 1. It is quite clear that Comp. 1 has substantial adverse effects on crystal structure as the dosage levels are increased. At 25 ppm (FIG. 4B) the crystal faces show the same type of plate-like defects exhibited by the crystals when precipitated from recycled brine. This strongly suggests that the acrylate portion of the polymer is responsible for the observed defect structure. Note the dramatic effects as Comp. 1 levels reach the >100 ppm level. The resulting $Na_2CO_3.H_2O$ product from brine solutions containing these levels of Comp. 1 is like flour.

Figure 4A:
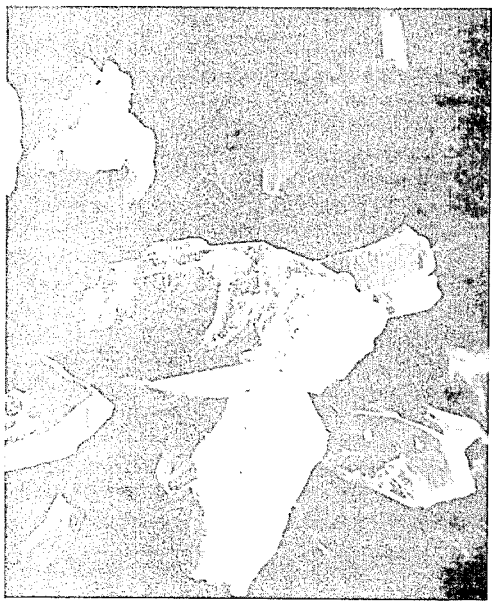
Figure 4B:
Figure 4C:
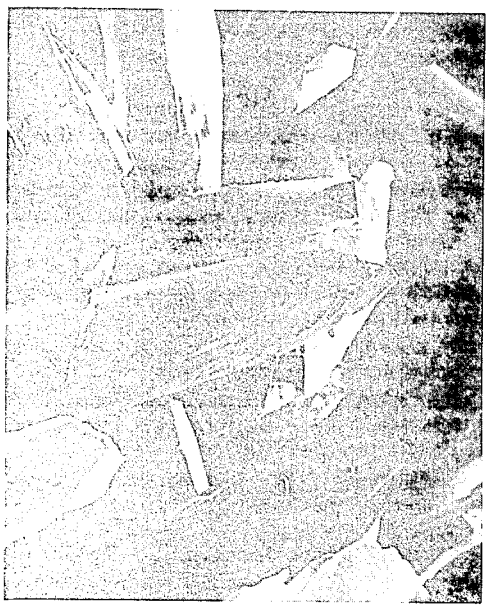
Figure 4D:
Figure 4E:
Figure 4F:
Figure 4G:
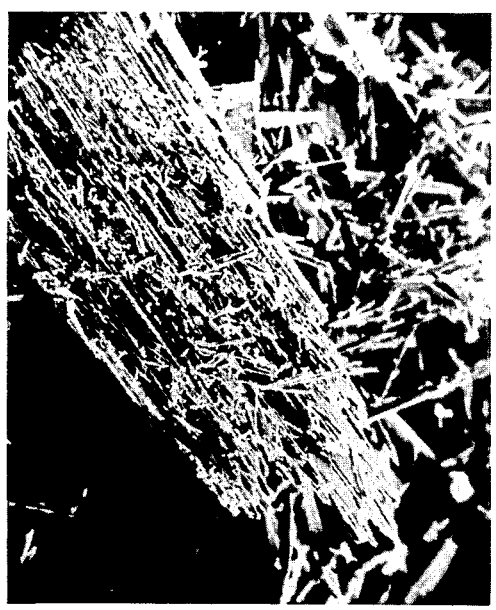
Figure 5:
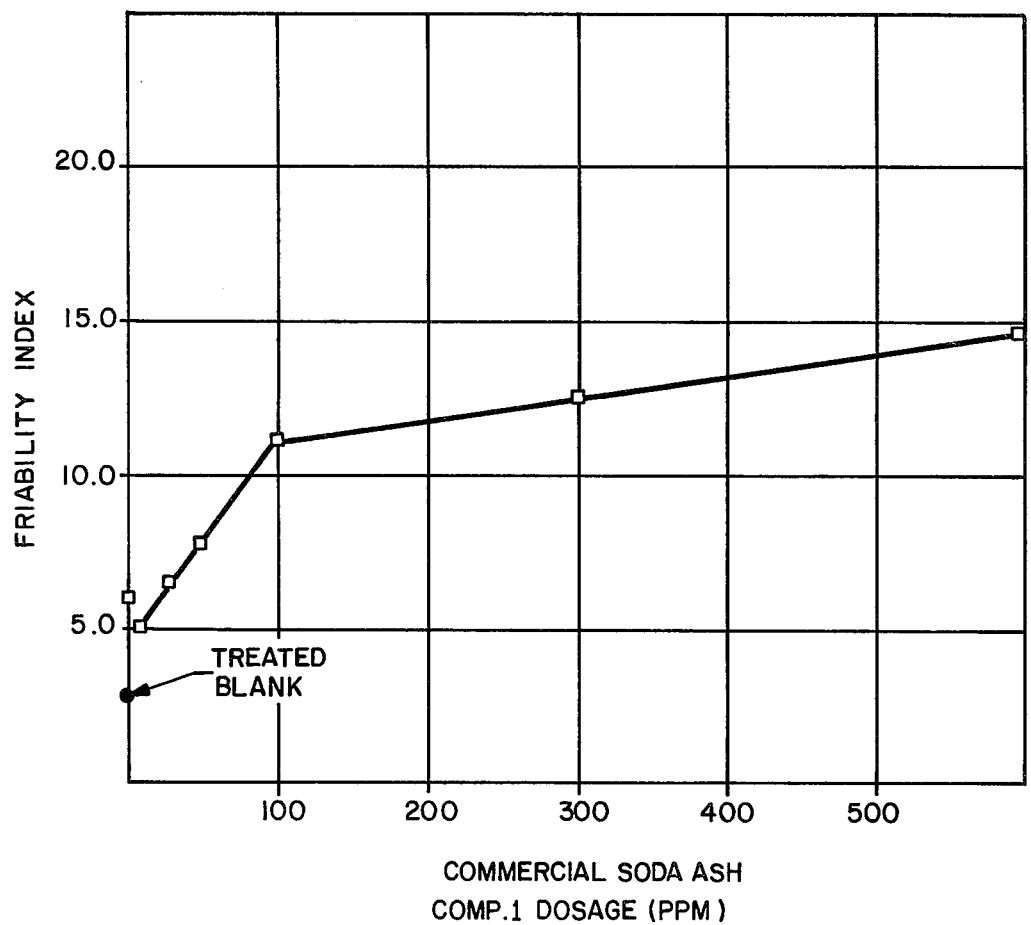

FIG. 5 is a graphical representation of the effect of Comp. 1 on the friability of soda ash crystals. At low dosages (i.e., <10 ppm) little effect on friability is found even though the SEM micrographs clearly show some structural effects (FIG. 4A). At 25 ppm, considerable crystal facial cleavage is observed and the friability is beginning to show some increase. At >100 ppm the crystals are severely damaged and the friability is extremely high.

In situ oxidation of the polyacrylate species using ammonium persulfate has dramatic negative effects on crystal morphology. The oxidation products would be expected to contain acid functionality, further supporting the premise of organic acids as the culprits for poor crystal quality.

3. Adsorbant/Cationic Program Effects

Tables I and II list a summary of some of the results of the research using a combination clay/cationic reagent scheme.

The initial work found that not only were the dosage requirements critical, but that the order of addition of the clay and cationic were important. Comp. 11 (a fatty di-quaternary amine) and Comp. 4 were first used as the laboratory program with excellent results. FIGS. 6A and 6B are SEM micrographs of $Na_2CO_3.H_2O$ crystals produced from a trona brine solution containing 1200 ppm Comp. 1 before and after treatment with the Comp. 4/Comp. 11 program. Before application of the reagent program, the crystals are severely deformed with splinter appearance on the faces. After treatment, no visible crystal damage is observed and the crystals are whiter in appearance. Crystal size distributions and friability results can be found in Table II.

In an effort to replace the Comp. 11 with a polymer product, a variety of cationic polymers were examined. Particular attention was given to the ability of the cationic species to function with Comp. 4 for crystal morphology improvement (with Comp. 1 present), foam reduction, and decolorization. A combination of Comp. 8 and Comp. 12 was found to give excellent results. While the exact product ratio does not appear too critical, a 50/50 blend was determined to be most suitable from a formulation consideration (designated Comp. 2).

To examine the role of the adsorbant species, a variety of materials were utilized in place of Comp. 4, including kaolin, pelletized bentonite, activated carbon, and calcium bentonite (see Table II). Both calcium bentonite and activated charcoal seemed to work as adsorbants.

Figure 7:
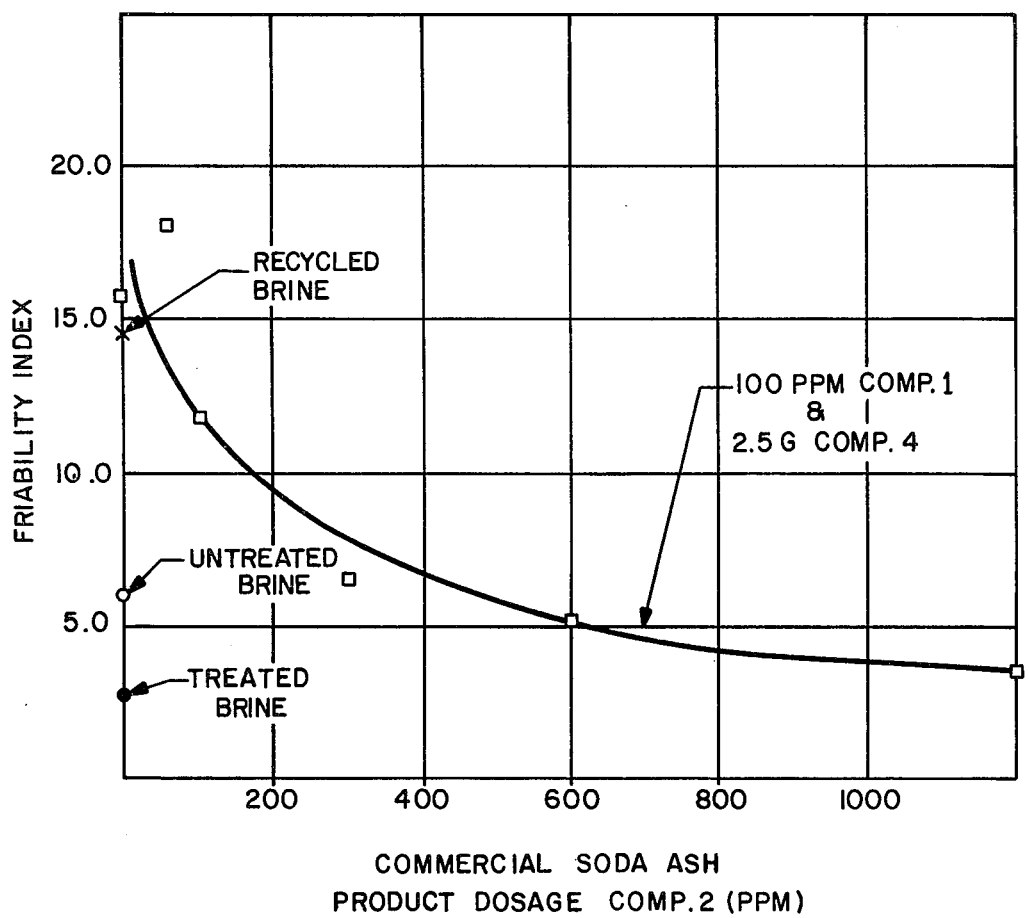

The effect of the Comp. 4/Comp. 2 program on crystal friability in the presence of 100 ppm Comp. 1 is shown in FIG. 7. Comp. 4 was added as a dry powder subsequent to the Comp. 2 injections. It appears to take about a 2:1 ratio of Comp. 2:Comp. 1 to completely scavenge the flocculant from the trona brine.

Figure 8A:
Figure 8B:
Figure 8C:

Subsequent research into the role of the clay adsorbant has shown that by pre-swelling the Comp. 4 in fresh water, (5% slurry) the quantity of clay necessary to perform adequately can be reduced by a factor of 10. Table III gives some analytical results on trona brine treated with 50 ppm of Comp. 2 and 500 ppm Comp. 4 (0.25 g added as a 5% pre-swelled slurry to 500 ml brine). Considerable reduction in TOC[4] levels are observed while no increases in either sulfate or silica levels are found. Both inorganic sulfates and silica are of a concern to soda ash manufacturers.
[4]Total Organic Carbon FIGS. 8A and 8B show micrographs of soda ash crystals produced from a synthetic brine solution (prepared commercially) using high organic pond water make-up. The invention appears very effective for "cleaning up" the system, as evidenced by the dramatically improved crystal quality shown in FIG. 8C.

4. Foaming Reduction

Foaming problems have been consistently experienced in the soda ash crystallizers due to the organic impurities in the brine. To reduce this problem, an antifoam reagent is used. Unfortunately, the antifoam contributes to organic contamination of the soda ash and prevents production of a low organic product.

Application of the Comp. 4/Comp. 2 program to crystallizer feed has been found to completely eliminate reactor foaming. Presumably, this is the result of a reduction in the organic impurity levels causing the foaming when the brine is program treated. Furthermore, a substantial decolorization of the brine is affected by reagent treatment with the resulting soda ash crystal being much whiter in color. While no good, quantitative analysis of the organic levels in the product soda crystal has been obtained, it is suspected that a lower organic product is produced.

TABLE I

Reagent Effects on Soda Ash Crystal Formation

| Chemical Program[1] | Crystal Morphology | Comments |
|---|---|---|
| Blank (unseeded) | Small Plates | Mild Foaming |
| Blank (seeded) | Small Plates | Mild Foaming |
| Locked Cycle[2] | Needles | Severe Foaming |
| Comp. 8 | Small Plates | Gummy Residue/ No Foam |
| Comp. 5 | Small Plates | |
| Comp. 1 | Needles | Foaming |
| Comp. 1 (solids)[3] | Needles | |
| Comp. 1 (components)[4] | Small Plates | |
| Comp. 7 | Flour | |
| Comp. 7 (solids)[3] | Needles | |
| Comp. 6 | Needles | |
| Comp. 1/ $(NH_4)_2S_2O_8$ | Needles | Decolorized |
| Comp. 1/ $(NH_4)_2S_2O_8$/ $BaCl_2$ | Needles | Decolorized |
| Comp. 9 | Needles | |
| Comp. 6 | Needles | |
| Comp. 6 (solids)[3] | Needles | |
| Comp. 10 | Small Plates | |
| Comp. 1/Comp. 8 | Flour | Gummy Residue |
| Comp. 1/Comp. 8/ Comp. 11[5] | Needles | No Foam |
| Comp. 1/Comp. 8/ Comp. 11/Comp. 4[6] | Large Plates | No Foam/ Low Viscosity |
| Comp. 1/Comp. 8/ Comp. 4 | Needles | Moderate Foaming |
| Comp. 1/Comp. 8 Comp. 11/Comp. 4[7] | Large Plates | No Foam/ Low Viscosity |
| Comp. 1/Comp. 8/ Comp. 4/Comp. 11[8] | Needles | Decolorized/ Foam |
| Comp. 1/Comp. 8 Comp. 4/Comp. 11 | Needles | Decolorized |
| Comp. 1/Comp. 8/ Comp. 11/Comp. 4 | Large Plates | Decolorized/ No Foam |
| Comp. 1/Comp. 8/ Comp. 11/Comp. 4[9] | Small Plates/ Needles | |

[1]Listed in order of addition. All reagents at 1200 ppm unless otherwise noted.
[2]Three cycles.
[3]Equivalent to 1200 ppm of commercial product.
[4]Identical to commercial product without polymer.
[5]Solution not filtered prior to crystallization.
[6]Added as 2.50 g.
[7]Solution filtered prior to crystallization.
[8]Clay/Amine added as single component.
[9]Clay at 1.25 g.

TABLE II

Reagent Affects on Soda Ash Size Distribution

| Treatment Reagent | Dosage | +40 | -40/+100 | -100 | Friability (%) -100 | Bulk Density (g/100 cc) |
|---|---|---|---|---|---|---|
| Commer. Product | — | 40.3 | 55.9 | 3.7 | 10.2 | 1.22 |
| Blank | — | 25.6 | 71.7 | 2.6 | 6.0 | 1.14 |
| Recycle | — | 23.4 | 72.3 | 3.7 | 14.4 | 1.04 |
| Comp. 1 | 1200 ppm | 44.8 | 39.3 | 16.0 | 52.1 | 0.659 |
| Comp. 1 | 600 ppm | 17.2 | 45.9 | 36.1 | 14.3 | 0.906 |
| Comp. 1 | 300 ppm | 24.4 | 39.1 | 36.2 | 12.4 | 1.04 |
| Comp. 1 | 100 ppm | 18.6 | 63.0 | 18.3 | 11.2 | 1.11 |
| Comp. 1 | 50 ppm | 26.9 | 67.3 | 6.0 | 7.7 | 1.13 |
| Comp. 1 | 25 ppm | 32.6 | 64.0 | 3.4 | 6.3 | 1.15 |
| Comp. 1 | 10 ppm | 33.2 | 62.0 | 4.9 | 5.0 | 1.22 |
| Comp. 4 | 2.5 g | 47.9 | 50.8 | 1.2 | 6.2 | 1.09 |
| Comp. 4 Comp. 2 | 2.5 g 2800 ppm | 33.4 | 65.4 | 1.1 | 2.4 | 1.24 |
| Comp. 1 Comp. 3 | 1200 ppm 2800 ppm | 23.0 | 51.7 | 24.6 | 29.0 | |
| Comp. 1 Comp. 4 Comp. 11 | 1200 ppm 2.5 g 1200 ppm | 73.2 | 26.2 | 0.5 | 1.0 | 1.04 |
| Comp. 1 Comp. 4 Comp. 8 Comp. 11 | 1200 ppm 2.5 g 1200 ppm 1200 ppm | 72.4 | 26.1 | 1.5 | 1.4 | 1.09 |
| Comp. 1 Comp. 4 Comp. 8 Comp. 11 | 1200 ppm 1.25 g 1200 ppm 1200 ppm | 26.8 | 55.5 | 17.7 | 3.2 | 1.23 |
| Comp. 1 Comp. 4 Comp. 8 Comp. 11 | 1200 ppm 2.5 g 1200 ppm 800 ppm | 49.3 | 48.9 | 1.7 | 1.5 | 1.16 |
| Comp. 1 Comp. 4 Comp. 8 Comp. 11 | 1200 ppm 2.5 g 1200 ppm 400 ppm | 16.5 | 38.1 | 45.0 | 15.0 | 1.03 |
| Comp. 1 Comp. 4 Comp. 11 | 1200 ppm 5.0 g 1000 ppm | 20.3 | 47.0 | 32.1 | 15.1 | — |
| Comp. 1 Comp. 4 Comp. 11 | 1200 ppm 2.5 g 1000 ppm | 25.8 | 44.8 | 29.4 | 19.7 | — |
| Comp. 1 Comp. 4 Comp. 3 | 1200 ppm 2.5 g 2800 ppm | 48.4 | 49.3 | 1.9 | 2.8 | 1.11 |
| Comp. 1 Comp. 4 Comp. 2 | 1200 ppm 2.5 g 2800 ppm | 47.5 | 50.5 | 1.5 | 2.4 | 1.14 |
| Comp. 1 Comp. 4 Comp. 8 Comp. 13 | 1200 ppm 2.5 g 1200 ppm 1200 ppm | 40.5 | 49.3 | 6.1 | 8.5 | 0.86 |
| Comp. 1 Comp. 4 Comp. 8 Comp. 12 | 1200 ppm 2.5 g 1200 ppm 1600 ppm | 46.5 | 52.7 | 1.3 | 1.9 | 1.09 |
| Comp. 1 Comp. 4 Comp. 8 | 1200 ppm 2.5 g 2800 ppm | 57.1 | 38.7 | 4.2 | 4.0 | 1.12 |
| Comp. 1 Comp. 4 Comp. 12 | 1200 ppm 2.5 g 2800 ppm | 63.9 | 32.9 | 3.2 | 7.4 | 0.88 |
| Comp. 1 Comp. 4 Comp. 14 | 1200 ppm 2.5 g 2.5 g | 42.6 | 55.9 | 1.6 | 3.1 | 1.15 |
| Comp. 1 Comp. 4 Comp. 3 | 1200 ppm 2.5 g 2800 ppm | 45.0 | 50.0 | 4.5 | 6.0 | — |
| Comp. 1 Comp. 15 Comp. 3 | 1200 ppm 2.5 g 2800 ppm | 53.1 | 45.5 | 1.3 | 14.5 | — |
| Comp. 1 Comp. 16 Comp. 3 | 1200 ppm 2.5 g 2800 ppm | 59.2 | 35.6 | 5.4 | 1.6 | 1.28 |
| Comp. 1 Comp. 17 Comp. 2 | 1200 ppm 1.5 g 2800 ppm | 39.6 | 45.7 | 15.1 | 7.8 | 1.20 |
| Comp. 1 Comp. 4 Comp. 17 Comp. 2 | 1200 ppm 1.25 g 1.25 g 2800 ppm | | | | | |
| Comp. 1 Comp. 4 Comp. 2 | 600 ppm 2.5 g 1200 ppm | 45.4 | 49.6 | 4.9 | 2.6 | 1.24 |
| Comp. 1 Comp. 4 Comp. 2 | 600 ppm 1.25 g 1200 ppm | 44.6 | 51.9 | 5.0 | 5.1 | 1.11 |
| Comp. 1 Comp. 4 Comp. 2 | 300 ppm 1.25 g 1200 ppm | 60.4 | 37.5 | 1.5 | 7.3 | 0.95 |
| Comp. 1 Comp. 4 Comp. 2 | 300 ppm 1.25 g 600 ppm | 33.24 | 59.3 | 7.3 | 11.9 | 1.00 |
| Comp. 1 Comp. 4 Comp. 2 | 300 ppm 0.6 g 600 ppm | 38.47 | 53.6 | 7.8 | 10.8 | 1.00 |
| Comp. 1 Comp. 4 Comp. 2 | 100 ppm 2.5 g 1200 ppm | 52.6 | 46.5 | 0.8 | 3.8 | 1.08 |
| Comp. 1 Comp. 4 Comp. 2 | 100 ppm 2.5 g 600 ppm | 41.9 | 53.3 | 4.5 | 5.7 | 1.03 |
| Comp. 1 Comp. 4 Comp. 2 | 100 ppm 1.25 g 600 ppm | 43.0 | 53.6 | 3.0 | 8.3 | 1.04 |
| Comp. 1 Comp. 4 Comp. 2 | 100 ppm 0.6 g 600 ppm | 33.1 | 61.2 | 5.5 | 7.0 | 1.20 |
| Comp. 1 Comp. 4 Comp. 2 | 100 ppm 2.5 g 300 ppm | 48.8 | 49.6 | 1.5 | 6.4 | 1.10 |
| Comp. 1 Comp. 4 Comp. 2 | 100 ppm 2.5 g 100 ppm | 41.1 | 55.3 | 2.3 | 11.7 | 0.94 |
| Comp. 1 Comp. 4 Comp. 2 | 100 ppm 2.5 g 50 ppm | 36.0 | 53.1 | 10.9 | 18.1 | 0.92 |
| Comp. 1 Comp. 4 | 100 ppm 2.5 g | 25.9 | 62.1 | 11.7 | 14.8 | 0.95 |

TABLE III

Commercial Brine Analyses

| Material | Untreated | Treated* |
|---|---|---|
| TOC | 160 ppm | 78 ppm |
| Sulfate | 290 ppm | 290 ppm |
| Si | 290 ppm | 290 ppm |

*50 ppm Comp. 2/500 ppm Comp. 4

I claim:

1. A method of removing anionic polymers and acidic organic impurities from aqueous trona solutions prior to crystallization whereby improved crystal formation is achieved which comprises treating such solutions with at least one nitrogen containing cationic compound consisting of water-soluble cationic polymers and fatty substituted quaternary ammonium salts followed by a solid adsorbant from the group consisting of clays and activated carbon.

2. The method of claim 1 where the polymer is a blend of poly-DADMAC and an ethylene dichloride ammonia polymer quaternized with methyl chloride and the adsorbant is a bentonitic clay.

3. The method of claim 2 where the bentonitic clay is a sodium montmorillonite known as hectorite.

4. The method of claim 1 where the fatty substituted quaternary ammonium salt is N-tallow pentamethyl propane diammonium chloride and the adsorbant is a bentonite clay.

5. The method of claim 1 where the cationic polymer is a blend of poly-DADMAC and a quaternized ammonia ethylene dichloride polymer.

6. The method of claim 1 where the fatty substituted quaternary ammonium salt is N-tallow pentamethyl propane diammonium chloride.

* * * * *